(No Model.)
J. D. BRUNTON & F. H. J. TRIER.
TURNING OR SHAPING STONE.
No. 252,726. Patented Jan. 24, 1882.
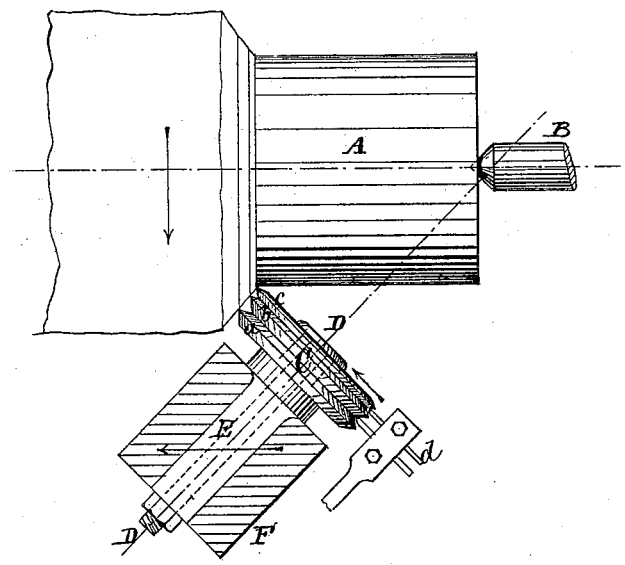
Witnesses:
E. A. Dick
H. C. Lane
Inventors:
J. D. Brunton
and F. H. J. Trier
by F. M. Bailey
atty.

UNITED STATES PATENT OFFICE.

JOHN D. BRUNTON AND FRANK H. J. TRIER, OF WESTMINSTER, COUNTY OF MIDDLESEX, ENGLAND.

TURNING OR SHAPING STONE.

SPECIFICATION forming part of Letters Patent No. 252,726, dated January 24, 1882.

Application filed September 28, 1881. (No model.)

*To all whom it may concern:*

Be it known that we, JOHN DICKINSON BRUNTON and FRANK HENRY JULIUS TRIER, (commonly known as FRANK TRIER,) subjects of the Queen of Great Britain, and residing at 19 Great George Street, Westminster, in the county of Middlesex and Kingdom of England, have invented certain Improvements in Turning or Shaping Stone, of which the following is a specification.

Our said invention relates to improvements in stone turning or shaping machinery of the kind described in Letters Patent of the United States granted to the said John D. Brunton on the 26th of December, 1871, No. 122,222; and it consists in the application of two or more circular revolving cutters mounted on one and the same axis or spindle and arranged at an angle to the surface operated, whereby the stone is cut away and reduced to the required shape with great regularity and precision, as hereinafter described.

The accompanying drawing is a plan of an apparatus constructed according to our invention as applied to the production of a round column or stone cylinder.

A is the stone to be turned, which is supported on suitable lathe-centers B, one only of such centers being shown in the drawing. A number of circular cutters, C, are fixed by means of the bolt D upon the hollow spindle E, which is supported so as to be free to revolve in the slide-rest F, and the cutters are arranged at an angle to the surface of the stone operated upon, so that the edges *a*, *b*, and *c* of the said cutters act simultaneously upon the stone at different depths, as shown. The axis of the cutters is arranged at a lower level than the axis of the cylinder, in order to give the cutters the requisite skew for clearance, and suitable points or scrapers, *d*, are fixed to the support for the purpose of clearing the spaces between the cutting-edges from dust and chips. The slide-rest supporting the cutters is capable of moving in the usual manner for the purpose of keeping the cutters up to their work. The stone A is caused to revolve in the direction of the arrow marked thereon in the drawing, and the cutters C, in addition to the rotary motion on their axis thus imparted to them, travel bodily in a direction parallel with the finished surface of the stone. By this means the stone A is cut and reduced to shape under very favorable conditions. In cutting stones liable to "pluck"—for example, such as marbles in general and the more beautifully variegated marbles in particular—the employment of the combination hereinbefore described is attended with the great advantage of preventing plucking. The action of the first cutting-edge, *a*, may produce plucks; but these will be removed by the succeeding cutting-edge, *b*, while the overlying stratum of stone will have the effect of counteracting to a considerable extent the tendency of the edge *b* to produce plucks by its own action, and the danger of plucks being produced by the next or third cutting-edge, *c*, is entirely obviated.

The combination of cutters hereinbefore described is also applicable to shaping stone in other than cylindrical forms—for example, the formation of straight or curved moldings; but this arrangement will form the subject of another application for Letters Patent.

We claim as our invention—

In stone-turning machinery, the combination, with a slide-rest, of two or more circular cutters mounted on one and the same axis or spindle and arranged at an angle, so as to take off successive layers or strata of stone, substantially as and for the purpose hereinbefore set forth.

In testimony whereof we have signed our names to this specification in the presence of two subscribing witnesses.

JOHN DICKINSON BRUNTON,
FRANK HENRY JULIUS TRIER.

Witnesses to the signature of John Dickinson Brunton:
CHAS. MILLS,
JOHN JAMES,
*Both of 47 Lincoln's Inn Fields, London.*

Witnesses as to the signature of Frank Henry Julius Trier, (commonly known as Frank Trier:)
F. ENGLERT,
FRANZ MÜLLER,
*Both of Mannheim.*